Figure 1:
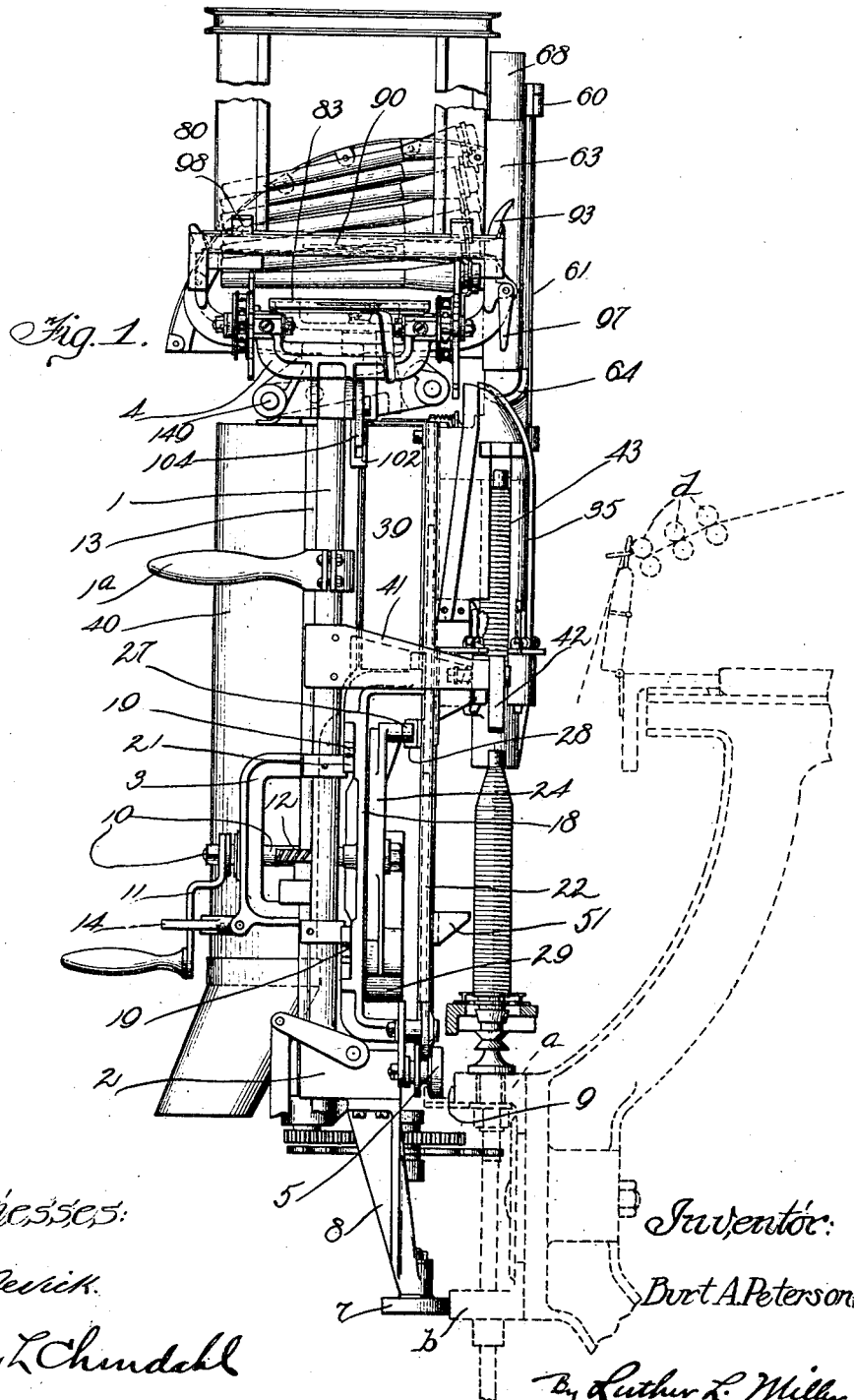

B. A. PETERSON.
SPINNING FRAME DOFFER.
APPLICATION FILED JAN. 6, 1912.

1,120,626.

Patented Dec. 8, 1914.
9 SHEETS—SHEET 1.

Witnesses:
J. C. Devick.
George L. Chindahl

Inventor:
Burt A. Peterson
By Luther L. Miller
Atty.

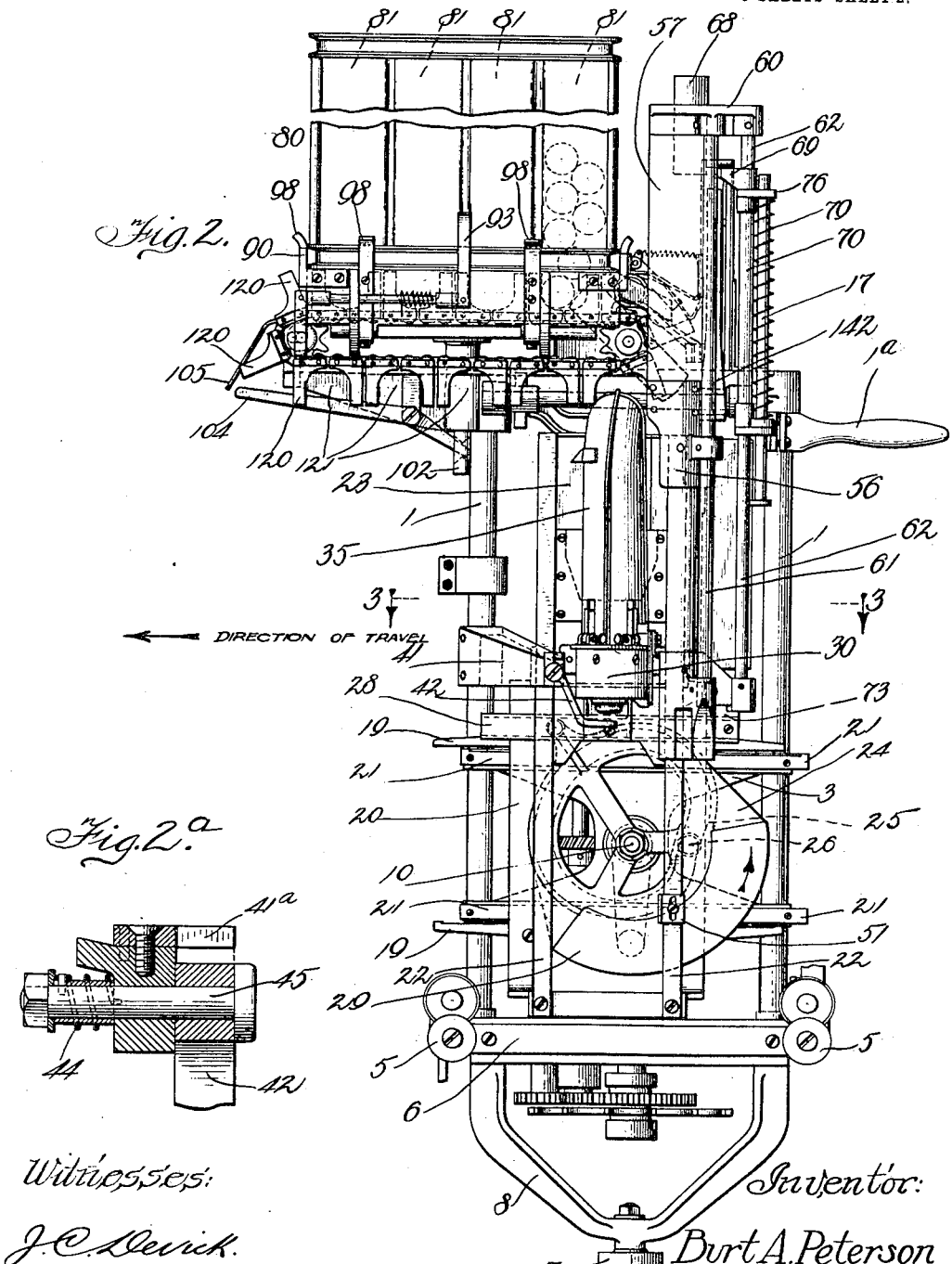

B. A. PETERSON.
SPINNING FRAME DOFFER.
APPLICATION FILED JAN. 6, 1912.
1,120,626.
Patented Dec. 8, 1914.
9 SHEETS—SHEET 3.
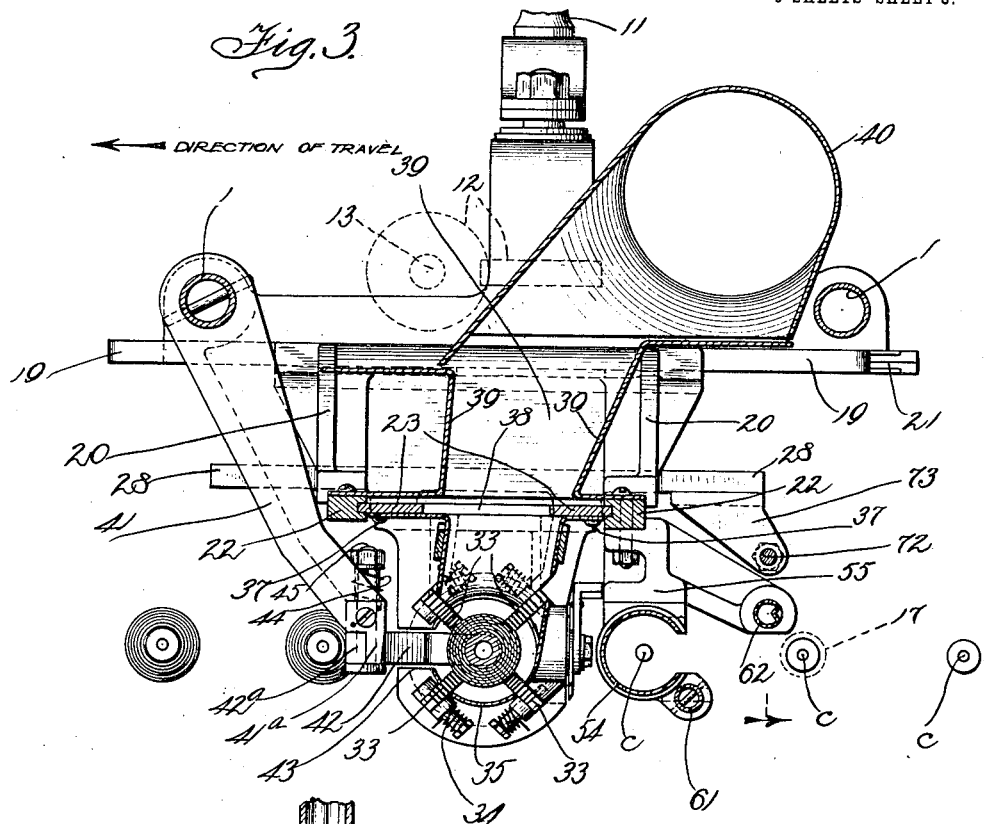
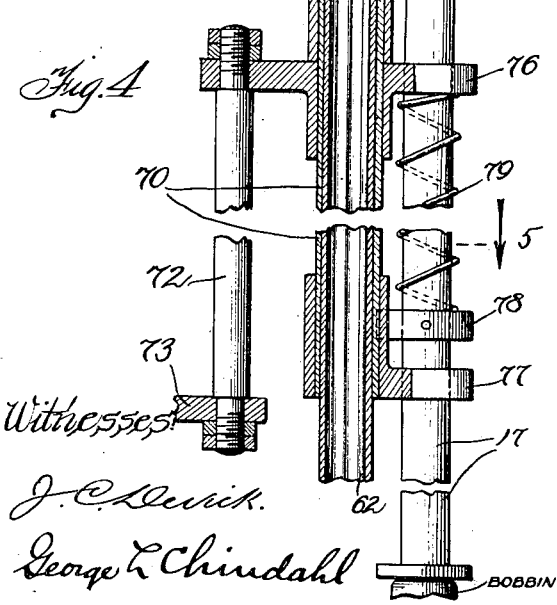
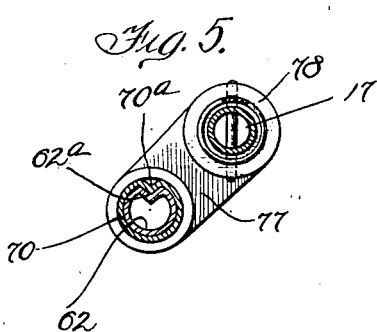
Witnesses:
J. C. Devick.
George L. Chindahl.
Inventor:
Burt A. Peterson
By Luther L. Miller
Atty.

B. A. PETERSON.
SPINNING FRAME DOFFER.
APPLICATION FILED JAN. 6, 1912.
1,120,626.
Patented Dec. 8, 1914.
9 SHEETS—SHEET 4.
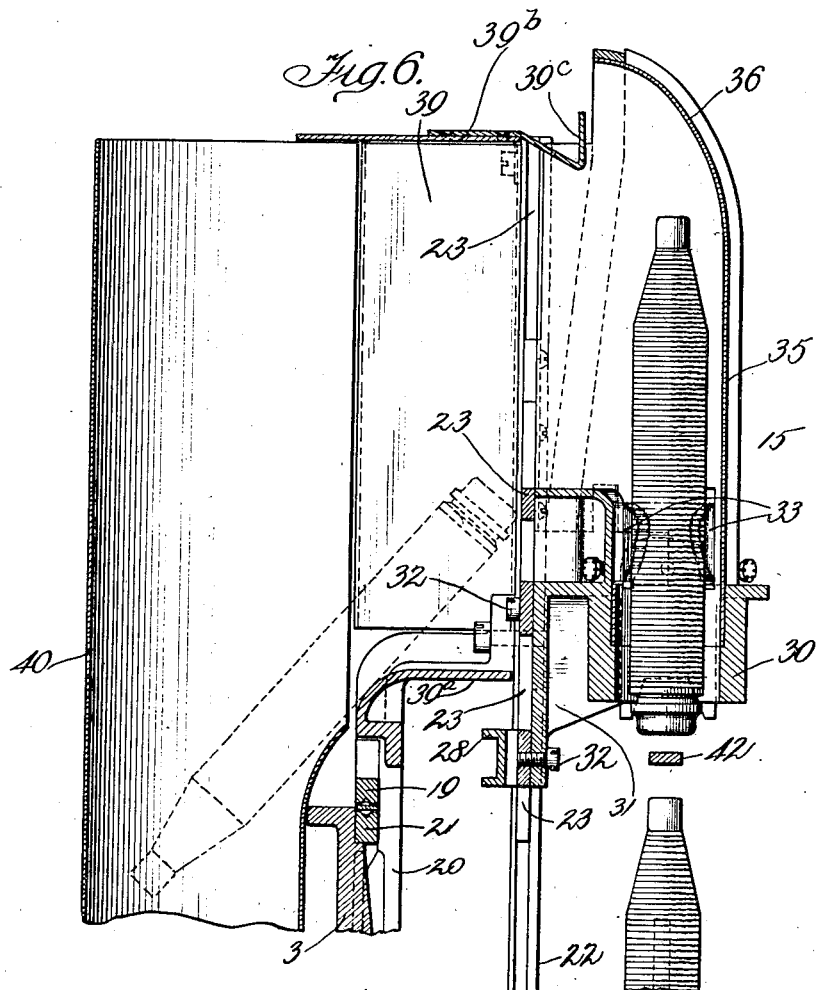
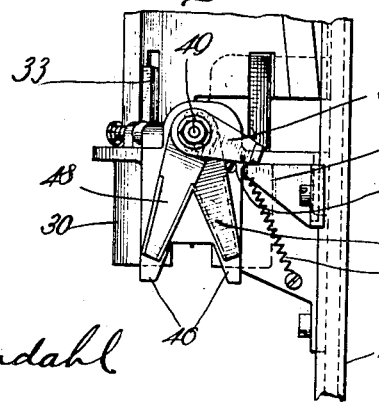
Witnesses:
J. C. Devick.
George L. Chindahl
Inventor:
Burt A. Peterson
By Luther L. Miller
Atty.

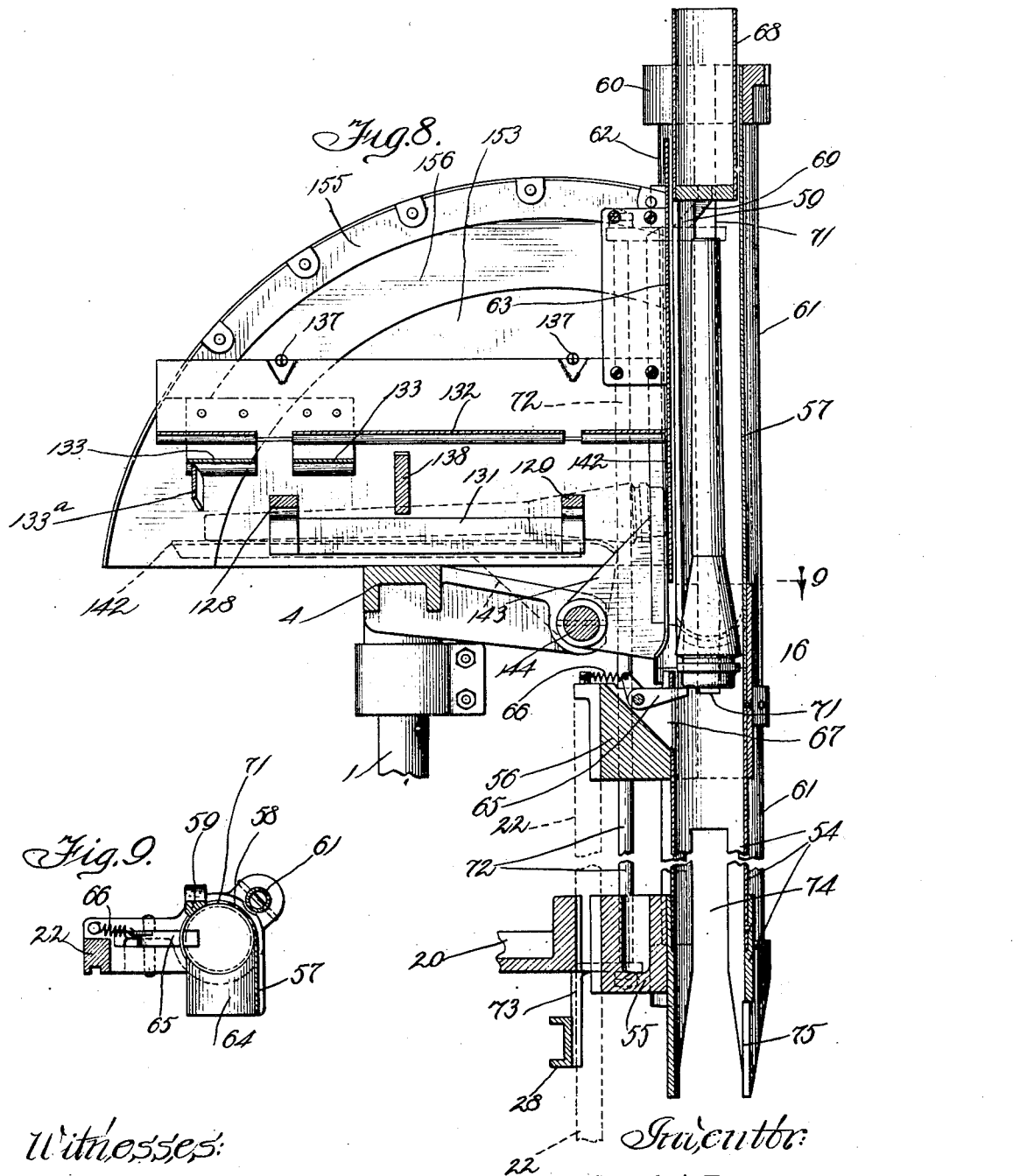

B. A. PETERSON.
SPINNING FRAME DOFFER.
APPLICATION FILED JAN. 6, 1912.
1,120,626.
Patented Dec. 8, 1914.
9 SHEETS—SHEET 6.
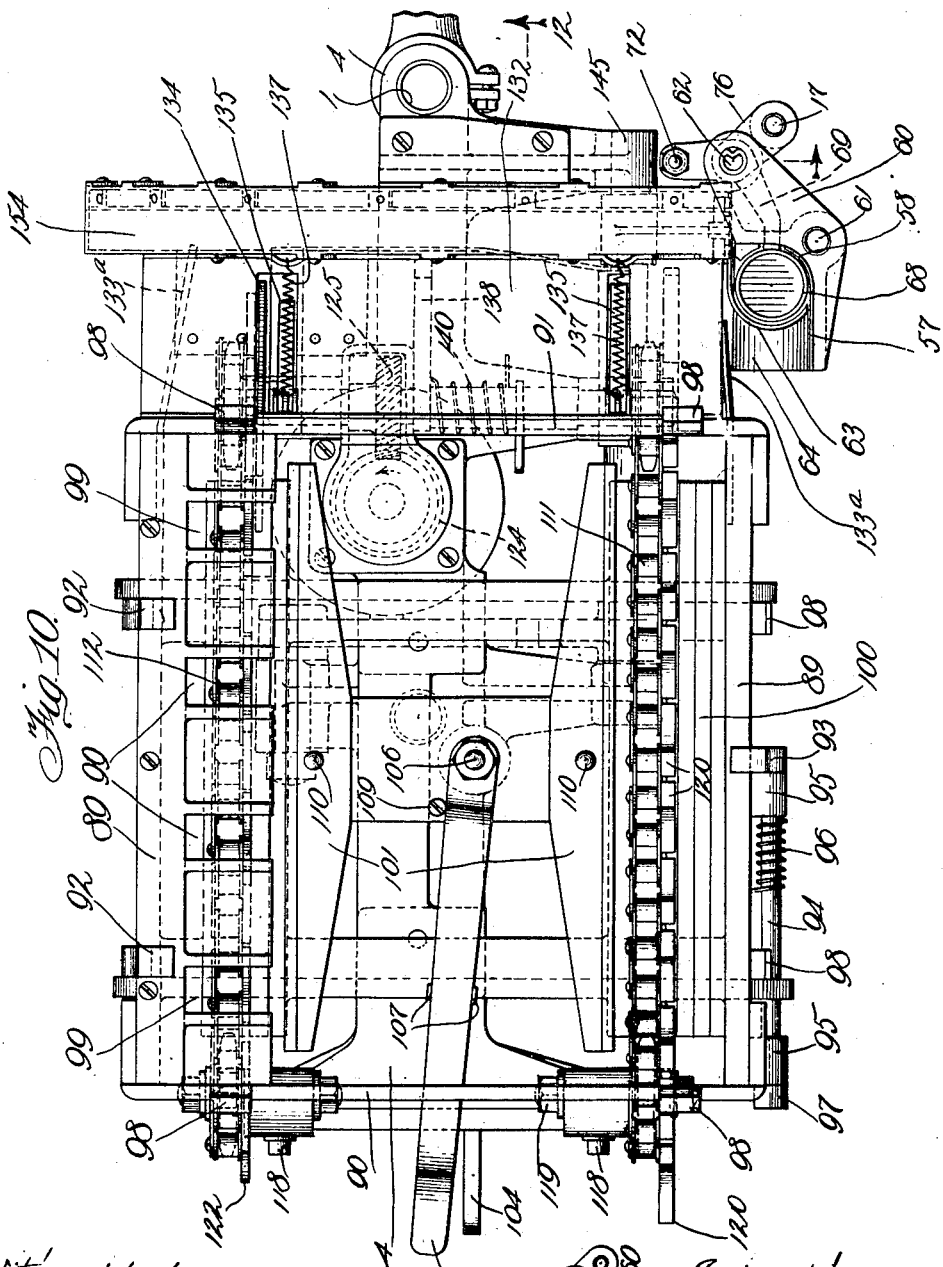
Witnesses:
J. C. Devick.
George L. Chindahl
Inventor:
Burt A. Peterson
By Luther L. Miller
Atty.

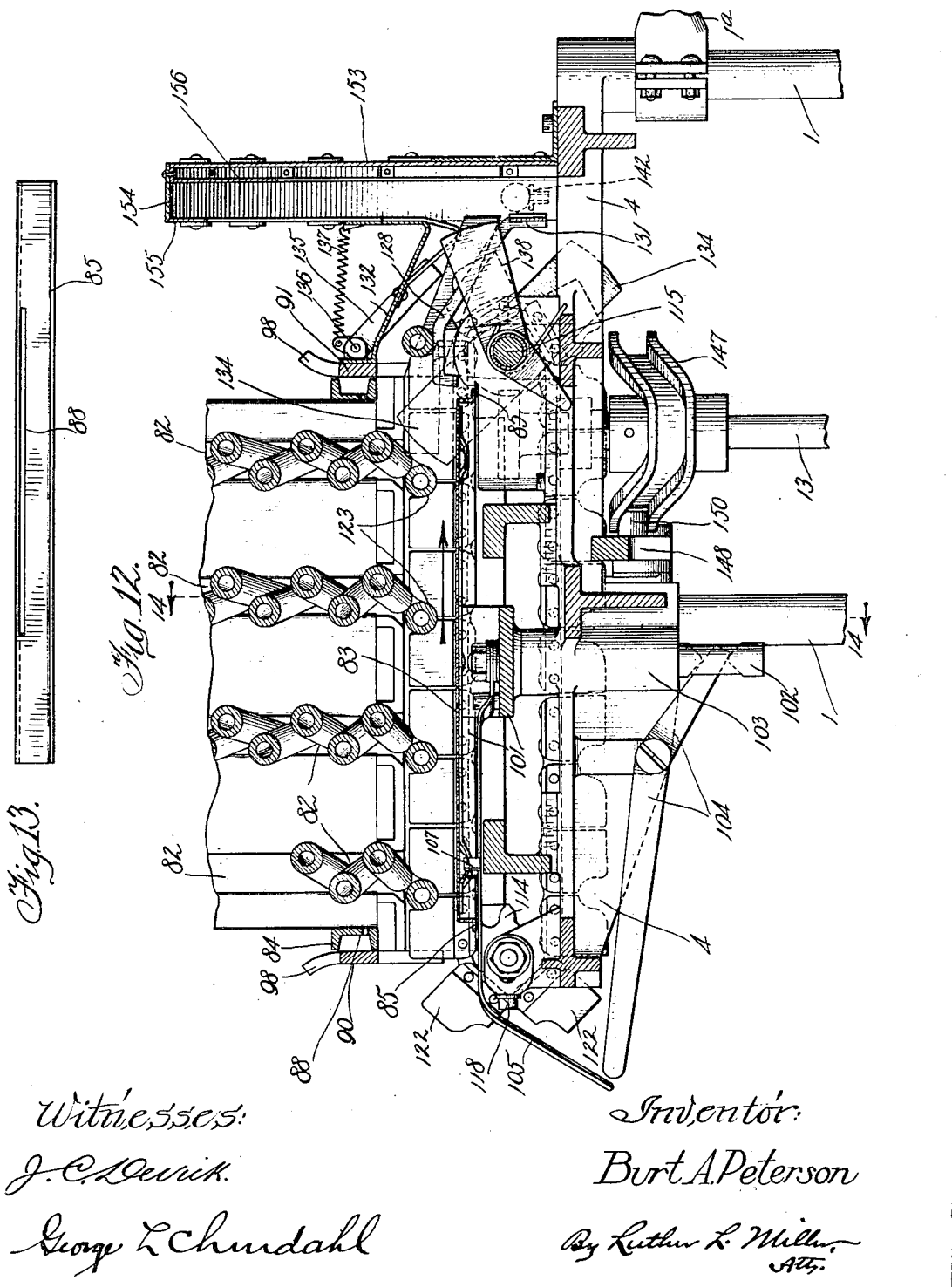

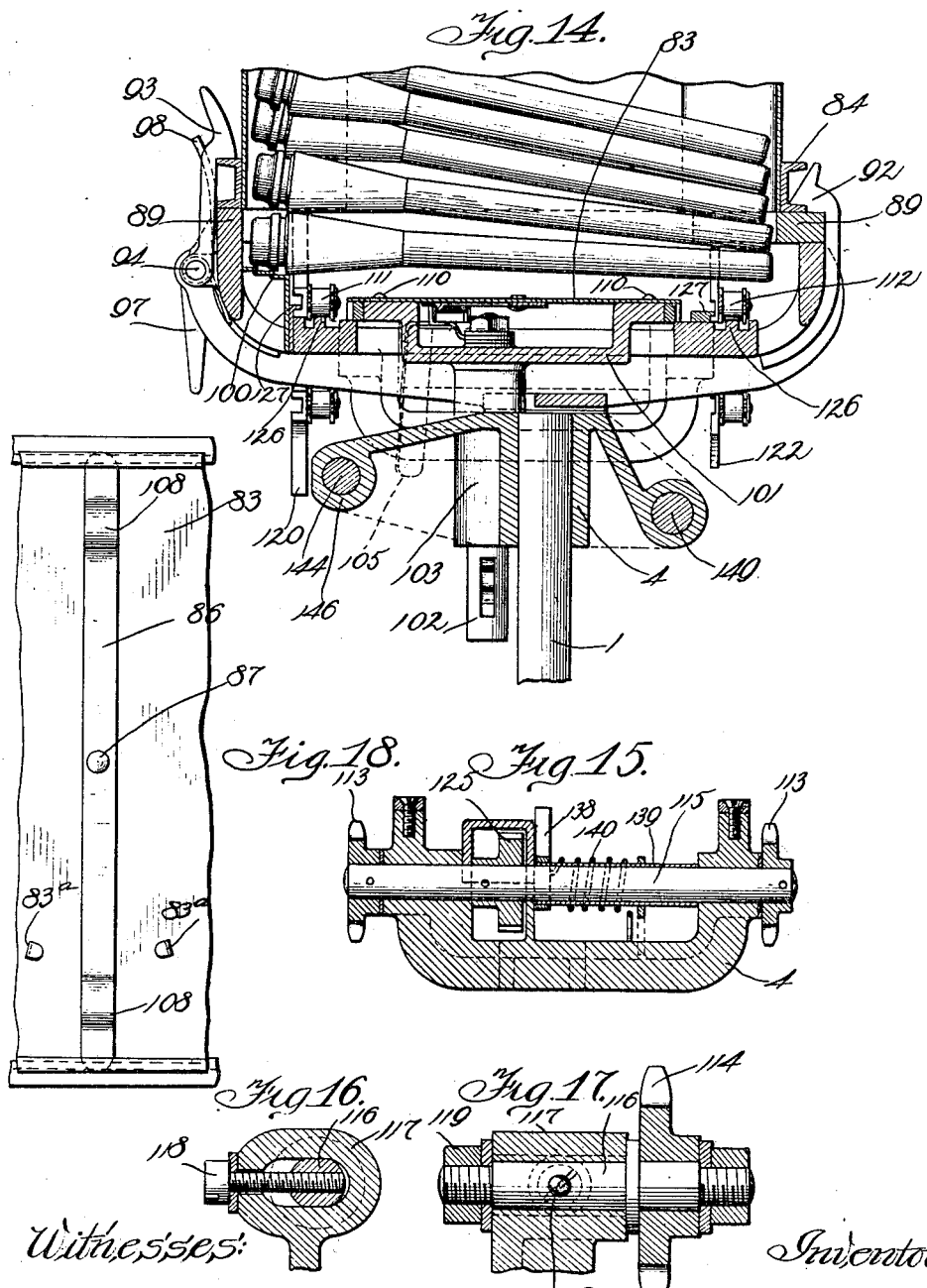

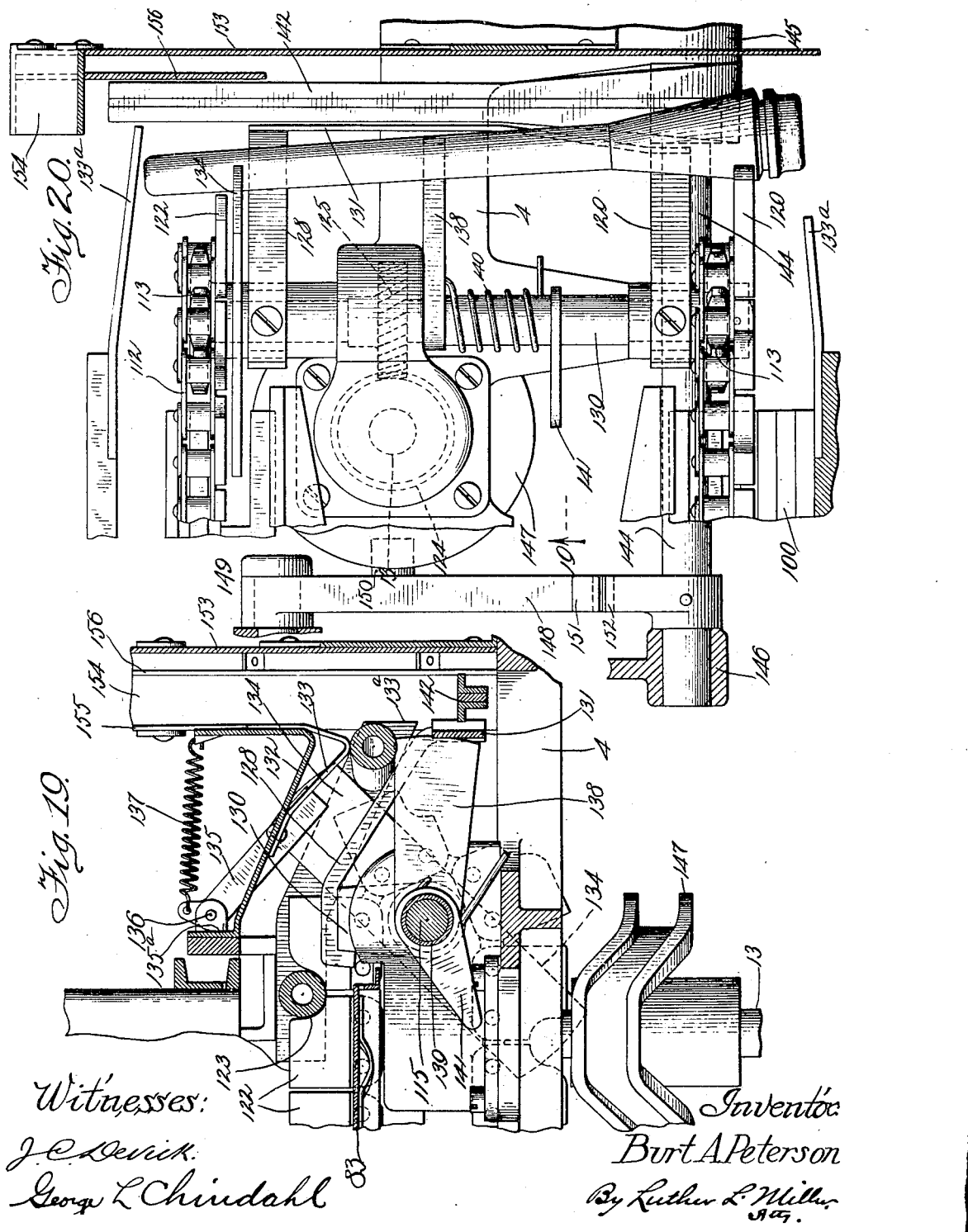

UNITED STATES PATENT OFFICE.

BURT A. PETERSON, OF ROCKFORD, ILLINOIS, ASSIGNOR TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

SPINNING-FRAME DOFFER.

1,120,626.   Specification of Letters Patent.   Patented Dec. 8, 1914.

Application filed January 6, 1912. Serial No. 669,767.

*To all whom it may concern:*

Be it known that I, BURT A. PETERSON, citizen of the United States, residing at Rockford, in the county of Winnebago and State of Illinois, have invented certain new and useful Improvements in Spinning-Frame Doffers, of which the following is a specification.

This invention relates to improvements in spinning-frame doffers of the portable type, such, for example, as shown in Patent No. 983,858 issued February 7, 1911, to Howard D. Colman and Burt A. Peterson, the machine herein shown being specially adapted to operate upon weft or "filling" bobbins.

Among the objects of the present invention are to simplify and otherwise improve the means for placing empty bobbins upon the spindles, the means for transferring empty bobbins from the magazine to said placing means, the means for ejecting doffed bobbins from the doffing device, the yarn-severing means, and the other mechanisms of a portable doffer.

In the accompanying drawings, Figure 1 is a side elevation of one form of doffer embodying the features of my invention, portions of the doffer being omitted, and parts of a spinning frame being indicated in the view. Fig. 2 is a rear elevation of the doffer, with parts omitted. Fig. 2ª illustrates the means for mounting the ejector finger. Fig. 3 is a sectional view taken in the plane of dotted line 3 3 of Fig. 2. Fig. 4 is a fragmental view of the bobbin seater and the means for actuating said seater and the bobbin-placing plunger. Fig. 5 is a section on line 5 of Fig. 4. Fig. 6 is a vertical sectional view principally illustrating the doffing device and the means for conducting the doffed bobbins to a suitable receptacle. Fig. 7 shows the thread-shear. Fig. 8 illustrates the bobbin placing means and a part of the means for transferring bobbins from the magazine to said placing means. Fig. 9 is a section on line 9 of Fig. 8. Fig. 10 is a top plan view with the magazine removed. Fig. 11 represents certain parts in a different position from that indicated in Fig. 10. Fig. 12 is a fragmental vertical section through the magazine and the upper part of the doffer mechanism, the view being taken in the plane of dotted line 12 of Fig. 10. Fig. 13 is an end view of the removable bottom for the magazine. Fig. 14 is a fragmental vertical section on line 14 of Fig. 12. Fig. 15 is a vertical sectional view taken in the plane of the shaft that supports one end of the bobbin conveyer. Figs. 16 and 17 are sectional views of the devices that support the opposite end of the conveyer. Fig. 18 illustrates a means for locking the removable bottom in place in the magazine. Fig. 19 illustrates some of the parts shown in Fig. 12 in a different position and upon a larger scale; the view in Fig. 19 is taken in the plane of line 19 in Fig. 20. Fig. 20 is a fragmental top plan view of the means for transferring bobbins from the magazine to the bobbin-placing means.

In the illustrated embodiment of my invention, the operating mechanisms and the magazine containing empty bobbins are mounted upon a framework or carriage adapted to be removably placed upon a spinning frame, and to be moved along such frame. Said carriage may be of any suitable character, that herein shown comprising two columns 1, a bottom bracket or cross-piece 2, a middle bracket 3 and a top bracket 4, all rigidly secured together. The carriage may be adapted to be mounted upon spinning frames by any suitable means, such as two grooved rollers 5 carried upon the ends of a bar 6, (Fig. 2) fixed to the bottom bracket 2, and a roller 7 attached to a bracket 8 fixed to the member 2. The rollers 5 run upon a channel-bar rail 9 secured to the spinning frame in any suitable manner adjacent to the forward edge of the upper flange *a* of the ladder rail of the spinning frame, while the roller 7 bears against the lower flange *b* of said rail. Handles 1ª are provided to assist in lifting the doffer on and off the spinning frame.

The timing and feeding mechanism that moves the doffer along the spinning frame and keeps its in step with the spindles may be of any preferred nature, as, for example, that fully illustrated and described in the above mentioned patent.

The doffing and donning mechanisms may be actuated by any suitable means, such as a shaft 10 mounted in the bracket 3, the forward end of said shaft bearing a hand crank 11. Connected to the shaft 10 through spiral gearing 12 is a vertical shaft 13 supported in bearings in the frame members 2, 3 and 4. When the machine is not in use the mechanism may be locked in initial position by any desired means, such as a detent 14. In the doffer carriage or framework are supported a doffing device 15, (Fig. 6), a donning device 16 (Fig. 8) and a bobbin-seater 17 (Fig. 2) arranged side by side. The distance between the centers of said doffing, donning and seating devices is equal to the distance between the centers of adjacent spindles $c$ upon the spinning frame.

When in operation upon a spinning frame, the doffer carriage or framework travels continuously, while the doffing device moves intermittently along the spinning frame, said device descending over a filled bobbin and rising with said bobbin during each interval between the steps of its progressive movement along the spinning frame. The movements of the bobbin-seater are similar to those of the doffing device. The donning device also moves step by step along the spinning frame, pausing above each spindle while a bobbin is being discharged from the donning device onto such spindle. These various movements may be produced by any suitable means, that herein disclosed comprising a slide frame 18 (Fig. 1) composed of two slides 19 rigidly attached to a frame 20 (Figs. 3 and 6). In the opposing faces of the slides 19 are formed ball-races complementary to races formed in bars 21 fixed to the bracket 3; a series of antifriction balls being placed in each pair of races. Secured to the frame 20 are two vertical grooved guide bars 22 (Figs. 1, 2, 3 and 6) in which is mounted a slide 23. The doffing device 15 is attached to the slide 23, while the donning device 16 and the bobbin-seater 17 are fixed to the slide frame 18. The slide frame 18 is reciprocated horizontally upon the bars 21, its speed when moving in the direction opposite to the direction of travel of the doffer carriage being the same as that of said carriage, whereby during such movement the slide frame 18 is stationary with reference to the spinning frame. Any suitable means may be employed for horizontally reciprocating the slide frame 18 and for vertically reciprocating the slide 23, the means herein illustrated comprising a cam disk 24 fixed upon the rear end of the shaft 10. There is a cam groove 25 in one face of said disk to receive a roller stud 26 carried by the slide frame 18, whereby the rotation of the cam disk causes the slide frame to reciprocate horizontally. On the opposite side of the cam disk is a roller stud 27 (Fig. 1) running in a channel bar 28 fixed to the slide 23, whereby the rotation of the cam disk causes vertical reciprocation of said slide 23. 29 is a counterweight portion of the cam disk serving to counterbalance the weight of the slide 23 and the parts carried thereby. By reason of the form of the cam groove 25, the slide frame 18 is stationary with reference to the spinning frame while a full bobbin is being doffed, and is then given a quick forward movement to place the doffing device, the donning device and the bobbin-seater in register with succeeding spindles.

The doffing device comprises a tubular member or sleeve 30 (Fig. 6) secured to the slide 23 by means of a bracket portion 31 and screws 32. Said sleeve carries suitable means for gripping a full bobbin, such as pivoted dogs 33 which are swung inwardly toward the axis of the sleeve by springs 34. When the sleeve is moved downwardly over a full bobbin the dogs 33 yield outwardly, and when the sleeve commences to move upwardly the dogs grip the bobbin and cause it to be pulled off its spindle as the sleeve rises. Above and alined with the sleeve 30 is a suitable guide 35 consisting, in this embodiment, of a sheet-metal structure having a curved wall 36. The sides of the guide are secured to the slide 23 at 37 (Fig. 3), and said slide is cut away at 38 opposite the open forward side of the guide. Guide plates 39 form between them a passageway for conducting the doffed bobbins from the guide 35 to the upper portion of a chute 40. 39$^a$ (Fig. 6) indicates the bottom of said passageway, and 39$^b$ a cover closing the top thereof.

39$^c$ is a guard to prevent the bobbin from jumping out of the doffing device by reason of its momentum when the upward movement of the doffing device is arrested. Any suitable receptacle may be arranged below the lower end of the chute 40, as, for example, some such box as is disclosed in Patents Nos. 983,858 and 1,067,058.

An arm 41 (Figs. 1 and 3) is fixed to one of the columns 1, and has pivoted to its rear end a finger 42. By reference to Fig. 2 it will be seen that when the doffing device begins to descend the butt of the doffed bobbin held by said device will contact the finger 42, whereby said bobbin will be prevented from descending with the doffing device. The continued descent of the doffing device carries the curved wall 36 against the upper portion of the bobbin, and causes the latter to tip forwardly into the passageway formed by the plates 39, and into the chute 40, which conducts the bobbin to the receptacle for full bobbins. The sleeve 30 and the guide 35 are slotted as at 43 to clear the finger 42 as the doffing device descends. When it is remembered that the doffer carriage or framework is traveling continuously, it will be understood that the finger 42 is moving horizontally away from the path of the doffing device while the latter is descending. After the doffing device has ascended, it takes a quick step forward into position above the end of the finger 42, as shown in Fig. 2. The finger 42 is pivotally supported so that it may yield upwardly should it be carried against the tip of a bobbin which is not properly seated upon its spindle. A torsion spring 44 acting upon the pivot 45 of said finger tends to hold the latter in its operative position, with the stop 42ᵃ of the finger against the stop 41ᵃ of the arm 41.

The means for severing the thread extending from the doffed bobbin to the spindle on which the bobbin was seated will next be described. A forked guide 46 (Fig. 7) is formed upon the sleeve 30 in position to receive the thread leading from the doffed bobbin to the spindle from which said bobbin was doffed. (See Figs. 28 and 29 of the drawings of the before-mentioned Patent No. 1,067,058.) A shear is mounted upon the sleeve 30 adjacent to the thread-guide 46, said shear consisting of a fixed blade 47 and a blade 48 pivoted on a screw 49. To the blade 48 is fixed an arm 50 arranged to impinge upon a stop 51, (Figs. 1, 2 and 7) on the adjacent guide 22 when the doffing device has nearly completed its downward movement. When the arm 50 contacts the stop 51, continued downward movement of the doffing device causes the blade 48 to shear the thread against the stationary blade 47. The stop 51 is adjustably mounted as indicated in Fig. 2.

52 is a spring which normally holds the shear open, and 53 is a stop engaged by the arm 50 to limit the opening movement of the shear.

The donning device comprises a guide for the empty bobbins, the lower portion of which guide consists of a tubular structure 54 (Fig. 8) secured to one of the guide bars 22 by means of brackets 55 56. The upper portion of the guide comprises a rear wall or flange 57 (Figs. 2, 8 and 9) extending tangentially to the tubular structure 54, a curved portion 58 concentric with the structure 54, and a bar 59 having a curved surface concentric with the structure 54. The upper ends of the parts 57 58 59 are secured to a bracket 60 which is rigidly connected with the brackets 55 56 by means of rods 61 62 which, if desired, may be tubular, as shown in Fig. 3. The upper portion of the guide for the empty bobbins further comprises a curved guard plate 63 (Fig. 10) fixed to a stationary part upon the doffer carriage. The parts 54 57 58 59 therefore, move as a unit to and fro horizontally with relation to the guard 63, as will be seen by comparing Figs. 10 and 11. The bracket 56 comprises a throat or guide 64 (Figs. 9, 10 and 11) the purpose of which will presently appear.

The empty bobbins are placed one at a time in the empty-bobbin-guide formed of the parts 54 57 59 63 by means to be hereafter described, the butt of the bobbin resting upon a finger 65 (Figs. 8 and 9) which is yieldingly held in operative position by a spring 66. The tubular structure 54 is slotted as at 67, the upper end wall of the slot forming a stop to determine the operative position of the finger 65. The bobbin is ejected from the guide by a plunger head 68 provided with an arm 69 by which the plunger is rigidly connected to a sleeve 70 (Figs. 2 and 4) slidable upon the rod 62. The sleeve 70 is provided with a rib 70ᵃ (Fig. 5) which slides in a groove 62ᵃ in the rod 62. The arm 69 travels up and down in the slot or space 71 (Figs. 8 and 9) between the parts 58 59. Such movement is imparted to the plunger through the medium of a rod 72 connected at its upper end to the arm 69 and at its lower end to a bracket 73 (Figs. 3 and 4) fixed to the channel bar 28. It will thus be seen that the plunger 68 moves up and down with the doffing device 15, both being connected to the slide 23. When the plunger descends, the bobbin is forced past the finger 65 and onto the bare spindle above which the donning device is located at the moment. The lower end of the tubular structure 54 is slotted at 74 (Fig. 8) so that said structure may clear the tip of the donned bobbin, said slot being extended far enough vertically to provide clearance for any bobbin which may not descend as far down onto its spindle as it should. The structure 54 is cut away at 75 to clear the upper portion of a bobbin when the doffer is lifted onto the spinning frame.

The donned bobbin is driven to its proper seat upon its spindle by the bobbin-seater 17, which seater consists of a plunger slidable in bearing lugs 76 77 (Fig. 4) attached to the upper and lower ends, respectively, of the sleeve 70. On the plunger 17 is fixed a collar 78 between which and the lug 76 a coiled spring 79 is interposed. When the donning plunger 68 descends, the bobbin-seating plunger 17 also moves downward to force the previously donned bobbin yieldingly to its seat. When the plunger 68 rises, the bobbin-seater is raised by the contact of the lug 77 with the collar 78.

A supply of empty bobbins may be contained within a magazine of any suitable character, the magazine 80 (Fig. 2) herein shown having partitions which provide vertical spaces 81 for the butts of the bobbins, and other partitions which form vertical spaces 82 (Fig. 12) for the tips of the bobbins. The width of the spaces 81 is greater than the diameter of a bobbin-butt, but less than twice such diameter, so that the bobbin-butts arrange themselves in staggered relation in said spaces. The width of the spaces 82 is substantially the same as the diameter of a bobbin-tip, the tips in each space 82 being vertically alined. The lower end of the magazine is provided with a removable bottom 83 (Figs. 12, 13 and 14) adapted to fit within the lower end frame 84 of the magazine. The operative position of the bottom 83 is determined by contact of flanges 85 on said bottom with the lower side of said end frame. The bottom is locked in place by means of a lever 86 (Fig. 18) centrally pivoted at 87 to the lower side of the bottom, the ends of said lever entering slots 88 in the bottom 83 and the end frame 84 when said lever is turned into the position indicated in Fig. 18.

The doffer framework comprises a seat 89 (Figs. 10 and 14) upon which the magazine 80 may be placed, the magazine being held against displacement by means of two stop flanges 90 91, two rigid hooks 92 (Fig. 14) and a hook 93 fixed upon a shaft 94 mounted in bearings 95, the hook 93 being normally held in operative position by a torsion spring 96. An arm 97 on the shaft 94 provides means for releasing the hook 93. 98 are curved guides to assist in positioning the magazine on its seat.

99 (Fig. 10) are openings formed through the seat 89 in alinement with the tip-spaces 82 of the magazine, and 100 is a ledge fixed in the framework below the butt-spaces 81.

Any suitable means may be employed to remove and replace the bottom 83 while the magazine is in position upon its seat 89, the means herein shown comprising a support 101 (Figs. 10 and 14) fixed to a spindle 102 which is slidable in a bearing 103 formed in the bracket 4. Said support is arranged to be raised by means of a hand lever 104, into contact with the lower side of the bottom 83. The means for operating the locking lever 86 consists of a lever 105 pivoted at 106 on the support 101, said lever 105 having thereon two lugs 107 adapted to lie at opposite sides of either of two projections 108 (Fig. 18) on the lever 86.

109 (Fig. 10) is a stop to limit movement of the lever 105 in the direction to lock the bottom in place.

83ª (Fig. 18) are stop lugs on the bottom 83 to limit the releasing movement of the lever 86. Assuming the lever 105 to be in the position represented in Fig. 10, if the lever 104 is operated to raise the support 101 into contact with the bottom 83, the lugs 107 will pass at either side of the adjacent projection 108. The support 101 being held up, the lever 105 is swung to one side, thereby turning the lever 86 so as to withdraw its ends from the slots 88. The support 101 may now be lowered, with the bottom 83 lying thereon. Pins 110 on said support (Figs. 10 and 14) entering openings in the bottom prevent lateral displacement of the latter, endwise displacement being prevented by the angular ends of the bottom fitting over the ends of the support. As the bottom 83 is being thus lowered, the bobbins in the magazine settle until the lowermost bobbins rest upon a bobbin-feeding means. In the present embodiment the bobbin-feeding means consists of a conveyer comprising two endless chains 111 112 (Figs. 10, 12 and 14) carried by sprocket wheels 113 114. The wheels 113 are fixed upon a shaft 115 (Fig. 15) mounted in bearings in the top bracket 4. Each of the wheels 114 is rotatably mounted upon a spindle or arbor 116 (Figs. 16 and 17) adjustably mounted in boxes 117 and movable by screws 118 to take up slack in the chains. 119 are nuts for locking the spindles 116 in adjusted position.

The chain 111 carries lugs 120 forming recesses 121 (Fig. 2) between them to receive the butts of the bobbins, while the chain 112 is provided with lugs 122 forming recesses 123 (Fig. 12) for the tips of the bobbins. The conveyer is continuously driven through a spiral gear connection (124 125) between the shafts 13 and 115. Between the sprocket wheels the upper runs of the conveyer chains are supported upon the rails 126 (Fig. 14). Upward displacement of the upper runs of the chains is prevented by grooving the lugs 120 122 to receive fixed guides 127.

It will be apparent from the drawings that the bobbins occupy a horizontal position in the magazine and a vertical position in the guide structure 54 57 59 63. The bobbins are discharged from the magazine in a horizontal position and are conducted to a device (hereinafter termed the erector) which places the bobbins in upright position. The erector operates within a casing which serves to confine and prevent displacement of the bobbins, and this casing is connected to the discharge end of the bobbin conveyer by suitable guide means. Referring to Figs. 12, 19 and 20, it will be seen that said conveyer deposits each bobbin upon two inclined guides 128 129 which lie between the vertical planes of the conveyer chains, and the upper ends of which are secured to bosses 130 on the top bracket 4. The lower ends of the guides 128 129 are connected by a plate or bar 131. Above the guides 128 129 is a cover plate 132 (omitted in Fig. 20). The passageway formed by the guides 128 129 and the plate 132 is made to conform generally in cross-sectional dimension to the shape of the bobbins by securing two guides 133 (Figs. 8 and 19) to the under side of said plate near its forward portion. These guides 133 prevent undue vertical play of the tip of the bobbin. Endwise displacement of the bobbin is prevented by fingers 133ª (Fig. 20).

The recesses 121 in the conveyer which receive the bobbin butts are sufficiently deep so that the lugs 120 cam or force the butts of the bobbins down the inclined guide 129. To supplement the lugs 122 in forcing the tips of the bobbins down the guide 128 I provide two diametrically opposite arms 134 fixed on the constantly rotating shaft 115 in position to swing up behind each bobbin brought forward by the conveyer, and force the tip of the bobbin down through the passageway between the guides 128 and 133.

To control the bobbins while they are being moved by the lugs 120 and 122 and the arms 134 through the passageway formed between the parts 128 129 132 133, I provide suitable means such as two dogs 135 (Figs. 10 and 19) pivoted at 136 in position to bear upon the opposite end portions of the bobbin, said dogs being pressed downward by springs 137. Downward movement of the dogs is limited by the contact of the portion 135ª of each dog with an adjacent fixed portion. It will be seen that each bobbin is moved, under complete control, down the inclined passageway formed by the guides 128 129 132 133, the bobbin being discharged onto the erector before alluded to. An arm 138 is fixed upon a sleeve 139 loosely mounted upon the shaft 115. A torsion spring 140 tends to swing the arm 138 into position to close the entrance to the erector casing, whereby the bobbin is guarded against displacement after said bobbin has been placed on the erector. Upward movement of the arm 138 is limited by a finger 141 fixed upon the sleeve 139 and arranged to stop against a portion of the bracket 4.

In the present embodiment, the erector consists of an arm 142 provided with a lug 143 (Fig. 8) by means of which it is mounted upon a rock shaft 144 supported in bearings 145 146 (Figs. 10 and 14). Said shaft is rocked to swing the erector 142 from its horizontal receiving position to a position parallel with and close to the guide structure 57 58 59, by means which may be of any suitable character, as, for example, a cam 147 (Fig. 12) fixed upon the shaft 13, a lever 148 pivoted at 149 and provided with a roller stud 150 engaging the cam, a gear-segment 151 (Fig. 20) formed on the lever 148, and a segment 152 meshing with the other segment and fixed to the shaft 144.

The erector casing is of such form as to inclose and prevent undue play of the bobbin while being erected. Herein I have shown the casing as consisting of a vertical wall 153, a curved wall 154, and a side flange 155, (Figs. 8, 10 and 12). To prevent lateral movement of the bobbin-tip there is provided a curved flange 156 extending parallel with the flange 155 and spaced therefrom a sufficient distance to accommodate the tip of a bobbin.

The operation of the various mechanisms has already been indicated, but may be summarized as follows: As the doffing device moves downward over a full bobbin, the dogs 33 swing outwardly to pass the bobbin. When the doffing device starts upward, the dogs grip the bobbin and cause it to rise with the doffing device. Upon the next descent of the doffing device, the bobbin is carried against the finger 42, which detains the bobbin until the curved wall 36 tilts the bobbin forwardly into the passageway between the plates 39, whereupon the bobbin falls through the chute 40 into the receptacle for full bobbins. The empty bobbins are removed singly from the magazine by the conveyer, and discharged into the passageway formed by the parts 128 129 132 133 133ª, through which passageway the bobbin is forced by the lugs 120 and 122 and the device 134. When the bobbin is deposited upon the erector 142, the latter swings into a vertical position, thereby erecting the bobbin and placing it in the guide formed by the parts 57 58 59 and 63. When the bobbin is thus placed in upright position, the slide frame 18 is in such position that the guide structure 54 57 is in the position indicated in Fig. 11, ready to receive the bobbin, the throatway 64 being provided to assist in guiding the butt of the bobbin to its proper position. After the bobbin has been erected, the slide frame 18 advances to position the doffing, donning and seating devices over the next succeeding spindles, the donning device being then in the position illustrated in Figs. 2 and 8, whereupon the plunger 68 descends, driving the bobbin past the finger 65 and onto the spindle. The slide frame then advances to position the seater 17 above said bobbin, and the seater moves downward, forcing the bobbin to its seat. The shear 47 48 severs the yarn leading to the doffed bobbin after the empty bobbin has been placed on the spindle formerly occupied by said doffed bobbin, and the end of the yarn clamped between the empty bobbin and the spindle as described in the beforementioned patent.

It will be evident that various changes may be made in the embodiment herein illustrated without departing from the spirit of the invention.

I claim as my invention:

1. In a doffer, a bobbin magazine, means for removing bobbins from the magazine, bobbin-donning means, a swinging device for placing bobbins in said donning means, means for guiding bobbins from the removing means to the swinging device, said removing means being arranged to move bobbins in said guide, and supplementary means for moving bobbins in said guide.

2. In a doffer, a bobbin magazine, means for removing bobbins from the magazine, bobbin-donning means, a swinging device for placing bobbins in said donning means, means for guiding bobbins from the removing means to the swinging device, said removing means being arranged to move bobbins in said guide, supplementary means for moving bobbins in said guide, and means for controlling the movement of bobbins in said guide.

3. In a doffer, a bobbin magazine, means for removing bobbins from the magazine, bobbin-donning means, means for placing bobbins in said donning means, and a revolving arm arranged to engage a bobbin and advance the bobbin from the removing means to said placing means.

4. In a doffer, a bobbin magazine, an endless conveyer for removing bobbins from the magazine, bobbin-donning means, means for placing bobbins in said donning means, and a revolving arm arranged adjacent to the discharge end of the conveyer and adapted to engage a bobbin and move it toward said placing means.

5. In a doffer, a bobbin magazine, an endless conveyer for removing bobbins from the magazine, said conveyer comprising an actuating shaft, bobbin-donning means, means for placing bobbins in said donning means, and two diametrically opposite arms each fixed upon said shaft in position to swing up behind a bobbin advanced by said conveyer to move said bobbin to said placing means.

6. In a doffer, a bobbin magazine, an endless conveyer for removing bobbins from the magazine, said conveyer comprising an actuating shaft located at the discharge end of the conveyer, bobbin-donning means, means for placing bobbins in said donning means, a guide extending between the discharge end of the conveyer and said placing means, said conveyer being arranged to move a bobbin in said guide, and an arm fixed upon said shaft and arranged to engage a bobbin to move the same in said guide.

7. In a doffer, a bobbin magazine, an endless conveyer for removing bobbins from the magazine, said conveyer comprising a tip-carrying belt and a butt-carrying belt, bobbin-donning means, means for placing bobbins in said donning means, means for guiding bobbins from the conveyer to the placing means, said belts being arranged to move bobbins in said guide, and means supplementing the tip-carrying belt in moving tips of bobbins in said guide.

8. In a doffer, a bobbin magazine, a conveyer for removing bobbins from the magazine, said conveyer comprising an endless tip-carrying belt and an endless butt-carrying belt, bobbin donning means, means for placing bobbins in said donning means, means for guiding bobbins from the conveyer to the placing means, said belts being arranged to move bobbins in said guide, a rotary shaft at the discharge end of the conveyer for actuating the latter, and two diametrically opposite arms fixed upon said shaft adjacent to the tip-carrying belt in position to swing up behind the tip of a bobbin brought forward by said belt, to move said tip through said guide.

9. In a doffer, a main framework, a slide-frame movable horizontally with relation to the main framework, a part mounted to slide vertically upon said slide-frame, a doffing device on said part, means for moving said slide-frame and part, and a stop attached to the main framework and supported in position to be engaged by a full bobbin carried by said doffing device when said part descends.

10. In a doffer, bobbin feeding means, means to receive the bobbins from said feeding means, a guide extending between said feeding means and receiving means, two spring-pressed members engaging the upper side of the end portions of a bobbin passing through said guide, and a spring-pressed member engaging the lower side of the mid-portion of such bobbin in said guide.

11. In a doffer, a main frame movable along the side of a spinning frame, vertical bobbin-guiding means reciprocable horizontally with relation to said main frame, means on said main frame for placing a bobbin in said guiding means, said guiding means being movable into and out of operative relation to said placing means, and a guard fixed upon said main frame and complementing said bobbin-guiding means.

12. In a doffer, a fixed vertically extending rod, a sleeve slidable on said rod, a bobbin-seating plunger yieldingly supported by said sleeve, and means for vertically reciprocating said sleeve.

13. A doffer comprising a main frame, a slide frame movable horizontally with relation to the main frame, a part mounted to slide vertically upon said slide frame, a disk having a cam groove therein, means attached to said slide frame for traveling in said groove, a crank pin carried by said disk and engaging said part, a vertical guide rod attached to said slide frame, a sleeve slidable upon said rod, guide lugs on said sleeve, a bobbin-seating plunger slidable in said guide lugs, a projection on said bobbin-seating plunger overlying one of said lugs, a coiled spring interposed between said projection and the other of said lugs, and a connection between said sleeve and said part.

14. In a doffer, a vertical tubular structure constituting a bobbin guide, means forming an upward extension of said guide, a pivoted spring supported finger arranged adjacent to the upper end of said tubular structure and adapted to underlie the butt of the bobbin and releasably support the same, means for placing the bobbin upon said finger, and a plunger for driving the bobbin down past said finger and through said tubular structure.

15. A doffer comprising a main frame, a structure mounted to slide with relation to said frame, a part mounted to slide with relation to said structure, a doffing device carried by said part, a disk having a cam groove therein, means attached to said structure for traveling in said groove, a channel bar attached to said part, a crank pin carried by said disk and engaging in said channel bar, a bobbin guide attached to said structure, a plunger operating in said guide, and means connecting said plunger to said channel bar.

16. In a doffer, a vertical bobbin guide, a vertical rod fixed with relation to said guide, a sleeve slidable upon said rod, a plunger connected to said sleeve and located within said bobbin guide, a bobbin-seating plunger yieldingly supported by said sleeve, and means for vertically reciprocating said sleeve.

17. In a doffer, a vertical bobbin guide, a vertical rod fixed with relation to said guide, a sleeve slidable upon said rod, a plunger connected to said sleeve and located within said bobbin guide, a bobbin-seating plunger supported by said sleeve for vertical sliding movement, a spring tending to move said seating plunger downwardly, and means for vertically reciprocating said sleeve.

18. A doffer comprising a main frame, a slide frame movable horizontally with relation to the main frame, a part mounted to slide vertically upon said slide frame, a doffing device attached to said part, a disk having a cam groove therein, means attached to said slide frame for traveling in said groove, a channel bar attached to said part, a crank pin carried by said disk and engaging in said channel bar, a vertical bobbin guide attached to said slide frame, a vertical guide rod also attached to said slide frame, a sleeve slidable upon said rod, a bobbin plunger attached to said sleeve and operating within said bobbin guide, guide lugs on said sleeve, a bobbin-seating plunger slidable in said guide lugs, a projection on said bobbin-seating plunger overlying one of said lugs, a coiled spring interposed between said projection and the other of said lugs, and a rod connecting said sleeve to said channel bar.

19. In a doffer, in combination, a main framework, means for causing said framework to travel, a slide-frame movable horizontally with relation to the main frame, a part mounted to slide vertically upon said slide-frame, means for moving said slide-frame and part, a doffing device attached to said part, an arm fixed to the main framework at the advancing side thereof and extending rearwardly, and a finger attached to said arm and arranged in the vertical plane in which the doffing device reciprocates, said finger being arranged to be engaged by a full bobbin carried by said doffing device when the latter descends.

20. In a doffer, a bobbin-gripping device, means for guiding said device to move vertically, means for reciprocating said device on said guiding means, a shear carried by said gripping device, and means attached to said guiding means for actuating said shear.

21. In a doffer, a bobbin-gripping device, means for guiding said device to move vertically, means for reciprocating said device on said guiding means, a shear blade attached to one side of said gripping device, a co-acting shear blade movably attached to said gripping device, said movable shear blade having a member attached thereto, and a member attached to said guiding means and arranged to be engaged by the first mentioned member during the downward movement of said gripping device for moving said movable shear blade into closed position.

22. In a doffer, a bobbin-gripping device, means for guiding said device to move vertically, means for reciprocating said device on said guiding means, a shear blade attached to one side of said gripping device, a co-acting shear blade movably attached to said gripping device said movable shear blade having an arm attached thereto, and a projection attached to said guiding means and arranged to be engaged by said arm during the downward movement of said gripping device for moving said movable shear blade into closed position.

23. In a doffer, a vertically reciprocatory slide, a sleeve attached to said slide, bobbin gripping dogs carried by said sleeve, a yarn-guiding fork located on a portion of said sleeve and at one side thereof, a shear blade attached to said sleeve adjacent to said fork, a coacting shear blade pivoted to said sleeve, an arm fixed to said pivoted shear blade, a spring acting upon said arm and tending to hold said pivoted shear blade in the open position, and a projection fixed with relation to said guide means in position to be engaged by said arm near the end of the downward movement of said sleeve.

24. In a doffer, a bobbin magazine, means for removing bobbins from the magazine, bobbin-donning means, a swinging device for transferring bobbins from said removing means to said donning means, a casing inclosing said swinging device, said casing having an entrance for a bobbin, and means to close the entrance after the bobbin has entered the casing.

25. In a doffer, a bobbin magazine, means for removing bobbins from the magazine, bobbin-donning means, a swinging erector for transferring bobbins from the removing means to the donning means, a casing inclosing said erector, said casing having an entrance for the bobbins, and a spring-pressed arm arranged in the path of the entering bobbins and arranged to be depressed by said bobbins, said arm when in its upper position serving to close the entrance to the casing.

In testimony whereof I affix my signature in the presence of two witnesses.

BURT A. PETERSON.

Witnesses:
W. C. R. HEYM,
LOUISE A. CULVER.